G. R. MELONEY & A. F. WOOD.
MILK WEIGHING MACHINE.
APPLICATION FILED MAR. 20, 1909.

1,006,968.

Patented Oct. 24, 1911.
4 SHEETS—SHEET 1.

Witnesses.

Inventors:
George R. Meloney.
Alfred F. Wood.
by their Attorneys
Howson & Howson

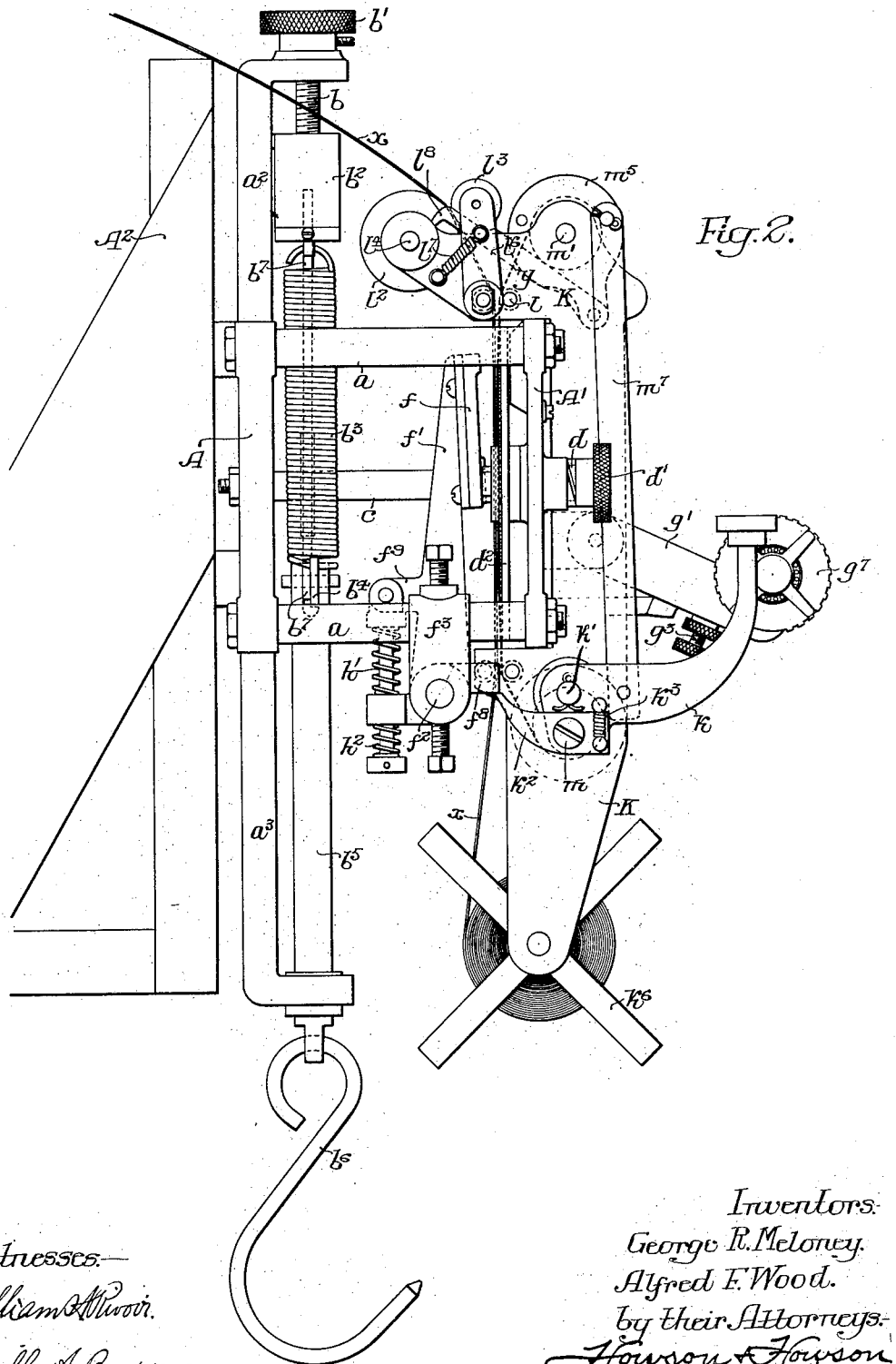

G. R. MELONEY & A. F. WOOD.
MILK WEIGHING MACHINE.
APPLICATION FILED MAR. 20, 1909.

1,006,968.

Patented Oct. 24, 1911.

4 SHEETS—SHEET 3.

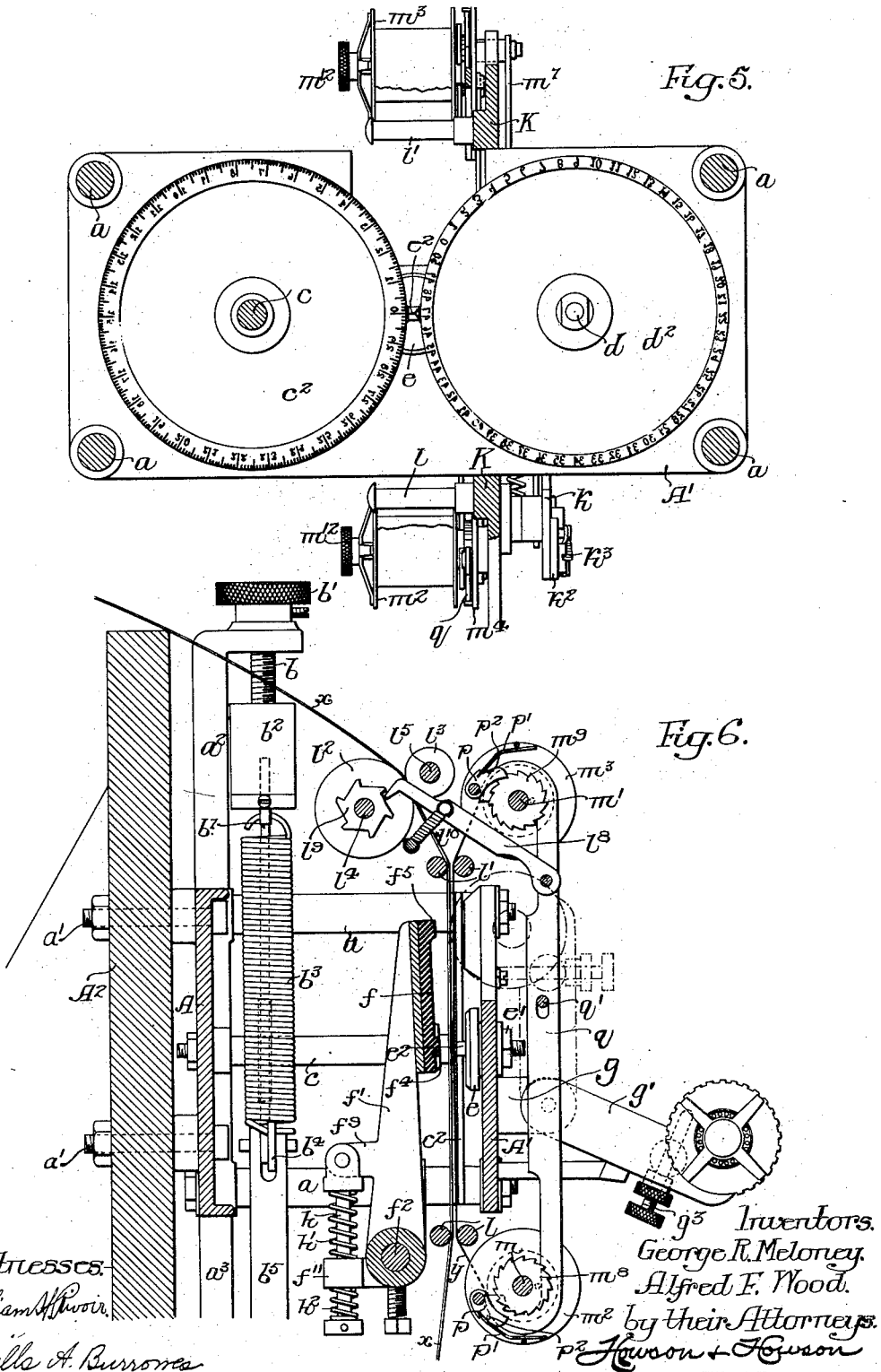

UNITED STATES PATENT OFFICE.

GEORGE R. MELONEY AND ALFRED F. WOOD, OF PHILADELPHIA, PENNSYLVANIA, ASSIGNORS TO DAIRYMENS SUPPLY COMPANY, OF LANSDOWNE, PENNSYLVANIA, A CORPORATION OF PENNSYLVANIA.

MILK-WEIGHING MACHINE.

1,006,968.      Specification of Letters Patent.      Patented Oct. 24, 1911.

Application filed March 20, 1909. Serial No. 484,650.

*To all whom it may concern:*

Be it known that we, GEORGE R. MELONEY and ALFRED F. WOOD, citizens of the United States, residing in Philadelphia, Pennsylvania, have invented certain Improvements in Milk-Weighing Machines, of which the following is a specification.

This invention relates to mechanism particularly designed to record upon a tape or ribbon the weight of any desired object; it being particularly desired that the device shall be relatively simple, accurate and compact in construction and not likely to get out of order.

A further object of the invention is to provide a weighing device by which, in addition to the weight of a body, it shall be possible to simultaneously record on a ribbon certain numbers or symbols, which shall designate the particular cow giving the milk weighed, as well as the date upon which the weighing takes place.

Another object of the invention is to provide a recording weighing machine, which shall include means for simultaneously marking upon the ribbon the impression of a portion of a scale depending upon the weight of the body under treatment, together with a pointer or index mark, and a number indicative or characteristic of the body whose weight is recorded.

It is also desired to provide a machine of the above noted character with improved inking and printing mechanism, as well as with novel means for intermittently feeding a recording ribbon, and operating and adjusting the various parts.

These objects and other advantageous ends we secure as hereinafter set forth, reference being had to the accompanying drawings, in which:—

Figures 1, 7:
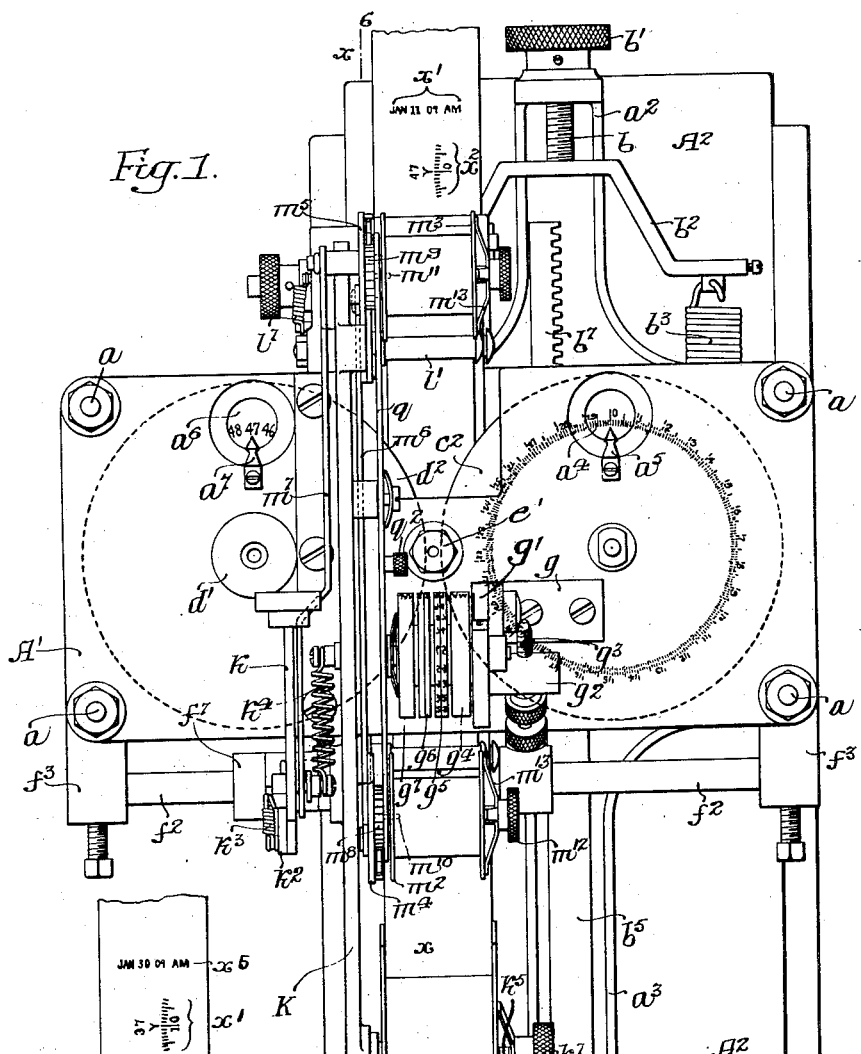
Figure 3:
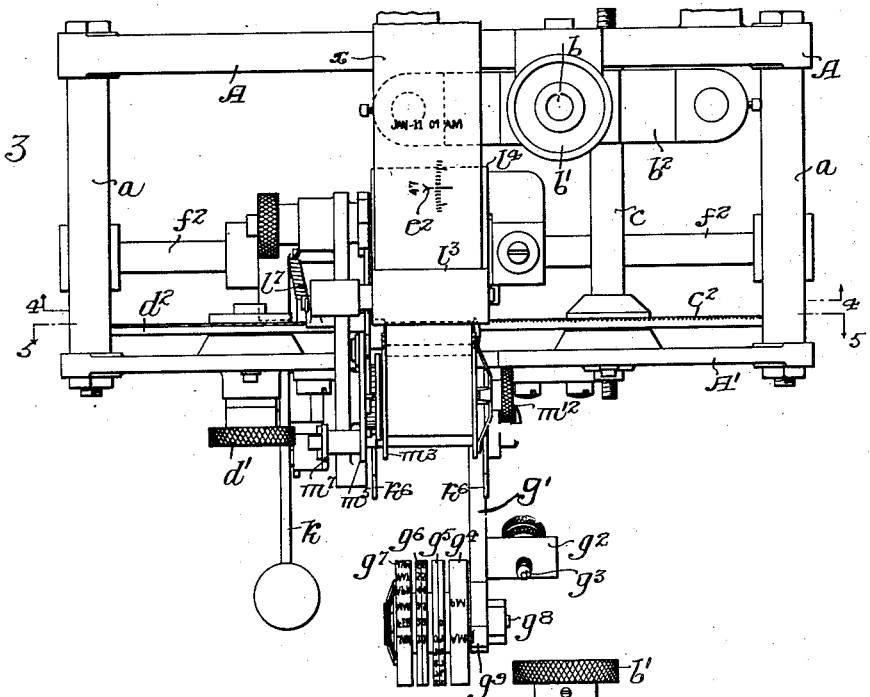
Figure 4:
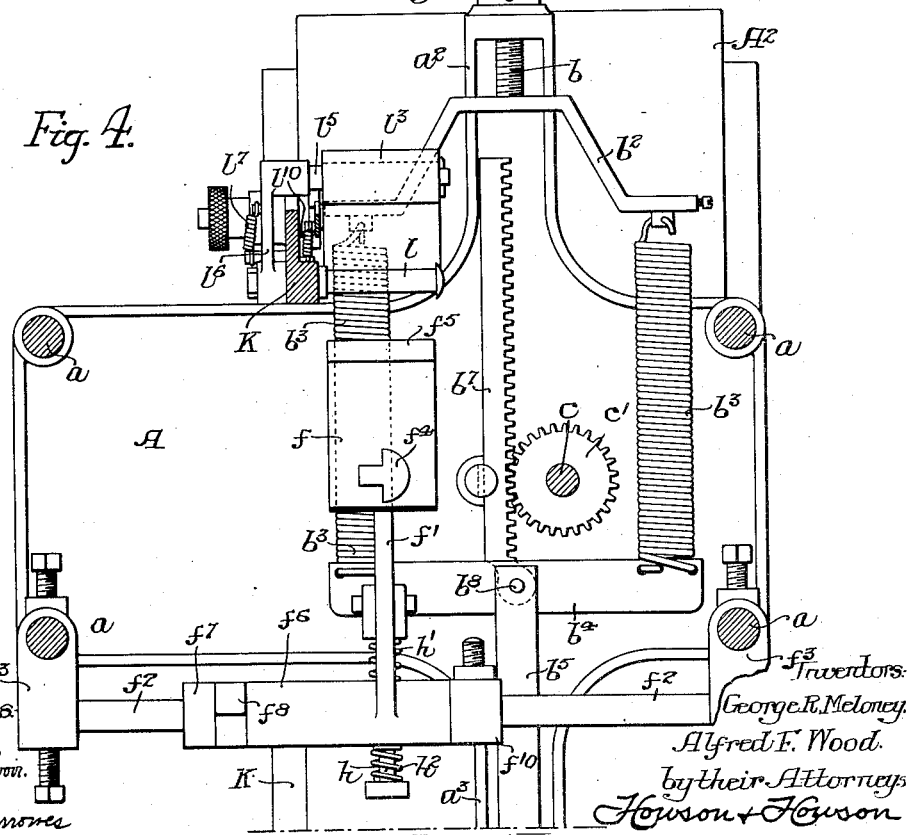

Figure 1, is a front elevation of our improved machine; Fig. 2, is a side elevation of the machine shown in Fig. 1; Fig. 3, is a plan; Fig. 4, is a vertical section on the line 4—4, Fig. 3; Fig. 5, is a vertical section on the line 5—5, Fig. 3; Fig. 6, is a vertical section on the line 6—6, Fig. 1, and Fig. 7, is a fragment of the paper, or other record receiving tape, showing a series of records thereon produced by the operation of our machine.

The frame of the device consists of a back plate A and a front plate A', both of a generally rectangular form and rigidly connected, so as to lie parallel with each other, by means of four bolts or spacing bars $a$ preferably extending between their corners.

The back plate A may be connected by means of bolts $a'$ to any suitable vertical supporting structure $A^2$, and it will be noted that it has an upper extension $a^2$ and a lower extension $a^3$, the first of which is overhung and perforated for the passage of a threaded rod $b$ carrying on its upper end an adjusting nut $b'$. Said rod carries a yoke piece $b^2$, to each end of which is connected the upper end of a spring $b^3$. The lower ends of these springs are connected by a transverse bar $b^4$, from which depends a rod $b^5$ passing through an opening in the outwardly projecting end of the plate extension $a^3$ and carrying at its extremity a hook $b^6$ for the attachment of any object to be weighed.

Extending between and journaled in the two plates A and A' is a shaft or spindle $c$ to which is fixed a pinion $c'$ meshing with a vertically extending rack $b^7$ whose lower end is connected to the transverse bar $b^4$, in the present instance by means of the pin $b^8$ whereby the bar $b^5$ is also attached. To this same shaft $c$ there is also fixed a printing wheel $c^2$ which is preferably placed immediately adjacent to the rear face of the front plate A' and is provided on the outer or peripheral portions of its inner face with a series of scale divisions and indicating numbers, both preferably raised or in relief.

While in the present instance the scale with its numbers is integral with the body of the wheel which is preferably of brass, any other known or equivalent means of mounting type on this wheel may be employed without departing from our invention.

The front face of the wheel is visible through an opening $a^4$ in the front plate A', and is preferably marked with an arrow or other symbol, so placed as to be in line with a stationary pointer $a^5$ mounted on said front plate, when the zero of the scale is in a predetermined position. Said pointer extends into this opening $a^4$, through which the symbol or mark on the wheel is visible.

The shaft $c$ with its wheel is preferably mounted to one side of the center of the frame and upon its other side is mounted a second and preferably similar wheel $d^2$.

This wheel is carried on a short spindle $d$ revolubly mounted in the frame and having a milled head $d'$ projecting from the front of the plate $A'$ so as to be readily turned by hand. This second wheel lies in the plane of the wheel $c^2$ and like it is provided around the periphery of its inner face with a series of raised figures of type, which in this instance run from 1 to 50; the front face of this wheel being provided with similar figures, which are visible through an opening $a^6$ in the plate $A'$, as indicated in Fig. 1. This opening is provided with a stationary pointer $a^7$ designed to coöperate with this latter set of figures, each of which is displaced around the periphery of the wheel through an angle of 45°, relatively to the same figure in the other set.

It will be noted that the two wheels $c^2$ and $d^2$ extend near each other, and, as shown in Figs. 5 and 6, there is mounted on the front plate $A'$, immediately adjacent to the front surfaces of the adjacent portions of these two wheels, an abutment formed by a circular plate or block $e$ which is held in place by a bolt $e'$ and is provided on its rear face with an indicating symbol $e^2$, having the form of an arrow, as shown in Fig. 5, and projecting so that its face lies in the plane which includes the type or printing faces of the number on the wheel $d^2$ and of the numbers and scale on the wheel $c^2$.

To the rear of the two wheels and directly back of the block or plate $e$, we mount a striking platen $f$ carried upon an arm $f'$ which in turn is movably mounted upon a supporting bar $f^2$ extending transversely of the frame. This bar is carried by brackets $f^3$ fixed to the lower pair of bolts or spacing members $a$. This platen $f$ is elongated in form and is preferably, though not necessarily, made of a material softer than that of the type on the wheels $c^2$ and $d^2$, it being faced in the present instance with hard rubber. As shown, there is at its lower part a raised portion $f^4$ directly back of a short length of the scale on the wheel $c^2$, and this raised portion extends also immediately back of the raised symbol $e^2$ on the block $e$ and back of a section of the wheel $d^2$ at least as wide as the space occupied by one of the numerals thereon. At the upper end of the platen is a second raised or projecting portion $f^5$ directly back of an opening in the top portion of the plate $A'$ and above the two type wheels. Mounted on the front of said plate $A'$ is an angle bracket $g$ to which is pivotally connected an arm $g'$ carrying at its upper end a series of type wheels $g^4$, $g^5$, $g^6$ and $g^7$, and having also a projecting stud $g^2$ in which is mounted an adjusting screw $g^3$. These various type wheels are revoluble upon their supporting spindle $g^8$ and have on their peripheral portions raised type, those on the wheel $g^4$ being capable in the present instance of printing the symbols "A. M." and "P. M."

The wheel $g^5$ has raised type corresponding to any of a number of years, the wheel $g^6$ is provided with type indicating the days of the month, and the wheel $g^7$ has type indicating the various months. The arm $g'$ on which these type wheels are carried, while normally resting upon a stop as shown in full lines, is capable of being turned on its pivot into a vertical position as indicated in dotted lines in Fig. 6, so that it projects through the opening in the upper portion of the plate $A'$ to a distance sufficient to permit certain of its type to extend into or preferably slightly beyond the plane of the type faces of the wheels $c^2$ and $d^2$.

From Fig. 4, it will be seen that the arm $f'$ has an extended hub $f^6$ held from moving longitudinally on its supporting rod $f^2$ by means of collars $f^7$ and $f^{10}$, and is also provided, as shown best in Figs. 2 and 6, with a projecting arm $f^8$. In addition there is a projection $f^9$ on the arm $f'$ which has pivoted to it a headed rod $h$. The collar $f^{10}$ has a rearwardly extending portion $f^{11}$ through which is a hole for the passage of the rod $h$ and there are springs $h'$ and $h^2$ placed respectively between this arm and the two heads of said rod $h$; the whole being so arranged that the arm $f'$ is normally held in the position shown in Fig. 6, and tends to return to such position when moved therefrom.

For the purpose of actuating the arm $f'$ in such manner as to cause the platen $f$ thereof to move toward the type wheels, so as to always strike a sharp rebounding blow of the same force, we provide an operating trigger $k$, consisting of a curved upwardly extending arm pivoted on a pin $k'$ carried by an angle bracket $K$ fixed to the front plate $A'$. Pivoted to a projecting portion of this arm is a dog $k^2$ normally maintained in a definite position by means of a spring $k^3$ and capable of engaging the arm $f^8$ of the hub $f^6$, though for a part only of the downward stroke of the trigger $k$. During the first part of this stroke the said dog engages the arm $f^8$ and turns the hub on its supporting bar, moving the platen $f$ to the rear against the action of the spring $h'$. Owing, however, to the circular path followed by the arm $f^8$, it is shortly disengaged by the dog, after which the above mentioned spring causes the hub, and with it the arm $f'$, to turn quickly on the supporting bar, with the result that the platen would violently strike the type of the various wheels, as well as the symbol $e^2$, were it not for the fact that the recording and inking ribbons hereafter described are interposed.

The operating trigger is normally maintained in its upper or raised position by means of a spring $k^4$ extending between it and the bracket K. This same bracket extends below the main frame of the machine and its lower end has a fixed spindle $k^5$ for the support of a wheel $k^6$, on which may be mounted a roll of paper or other ribbon upon which records are to be made. One end of this spindle is threaded and has mounted on it a milled head nut $k^7$, which confines between it and one of the side members of the wheel a four armed spring $k^8$. By adjusting this nut on the spindle, the spring may be forced against the side of the wheel so as to exercise various amounts of resistance to the movement of the same and so regulate at will the tension of the paper ribbon.

A pair of guide spindles $l, l$ are mounted on the bracket K just at or slightly below the lower edge of the plate A', so as to receive the paper ribbon between them, and a second set of similar parallel guide spindles $l', l'$ are likewise mounted on the same bracket at or slightly above the upper edge of the plate A'. Above these two last spindles and somewhat to the rear of them are mounted a pair of feed or nip rolls $l^2$ and $l^3$, the first of which is fixed to a spindle $l^4$ revolubly carried by the bracket K. The second nip roll $l^3$ is revolubly carried by a spindle $l^5$ which in turn is mounted upon an arm $l^6$ pivoted to the bracket K and normally pulled toward the nip roll $l^2$ by a spring $l^7$. The paper ribbon thus extends from the reel $k^6$ between the two guide spindles $l$, then upwardly to the rear of the two type wheels $c^2$ and $d^2$, in front of the platen $f$, between the two guide spindles $l'$, and finally between the two nip rolls $l^2$ and $l^3$. Projecting parallel to each other from the top and lower portions respectively of the bracket K, are two additional spindles $m$ and $m'$ upon which are two reels $m^2$ and $m^3$ for the reception of the type inking ribbon. Loosely carried on the lower spindle $m$ is a wheel $m^4$ operatively attached to a similar wheel $m^5$ on the upper spindle $m'$ by means of a connecting rod $m^6$; the arrangement of parts being such that movement imparted to one wheel turns the other wheel in an opposite direction. A link $m^7$ connects the upper of these wheels $m^5$ and the operating trigger $k$ in such manner that when said trigger is depressed, said wheels are turned through the same arc but in opposite directions.

As shown in Figs. 1 and 6, there are mounted upon the two spindles $m$ and $m'$ two ratchet wheels $m^8$ and $m^9$ respectively, the first being detachably connected to the wheel $m^2$ by means of a pin $m^{10}$, while the second is similarly connected to the wheel $m^3$ by means of a pin $m^{11}$. Each of the wheels $m^2$ and $m^3$ has pivoted to it a pawl $p$ normally held in engagement with one of the ratchet wheels $m^8$ and $m^9$ by means of a spring $p'$. Each of the pawls is provided with a projecting pin $p^2$ and there is slidably mounted on the bracket K a flat bar $q$ having a slot for the reception of a guide pin $q'$ and formed with its ends bent over so as to be capable of engaging either of said pins $p^2$. There is on said bar an operating head $q^2$ whereby it may be moved up or down at will and thereby caused to raise the upper pawl $p$ of the reel $m^3$ out of engagement with the teeth of the ratchet wheel $m^9$, or on the other hand to lower the pawl $p$ of the reel $m^2$ out of engagement with the teeth of its ratchet wheel $m^8$. Each of the spindles $m$ and $m'$ is threaded at its free end for the reception of a milled head nut $m^{12}$, and each of these nuts confines between itself and one of the ribbon reels an armed spring $m^{13}$ whereby the pressure exerted upon said reels may be varied at will so as to regulate the tension of the ink ribbon $y$. This latter ribbon, as will be seen from Fig. 2, extends from the lower reel $m^2$ over one of the guide spindles $l$, then upwardly parallel with the paper ribbon $x$ and between this and the type wheels, finally passing over one of the upper guide spindles $l$ to the upper ribbon reel $m^3$.

Pivoted to the upper wheel $m^5$ is a pawl $l^8$ capable of engagement with a ratchet wheel $l^9$ fixed to the nip roll $l^2$; there being a spring $l^{10}$ extending between the pawl and a portion of the bracket K whereby the former is normally maintained in engagement with the teeth of said ratchet wheel.

Under operating conditions, with the paper and ink ribbons arranged as shown in the drawings, the adjusting nut $b'$ is manipulated until the zero symbol on the wheel $c^2$ is directly opposite the arrow $a^5$ as shown in the opening $a^4$. This adjustment is made by reason of the fact that the raising or lowering of the screw $b$ by means of this nut correspondingly raises or lowers the yoke $b^2$, the springs $b^3$ and the transverse bar $b^4$, which in turn moves up or down the rack $b^7$ and turns the pinion $c'$ with the shaft $c$ so as to bring the type wheel $c^2$ on said spindle to the desired position, with the zero of its scale immediately adjacent to the symbol $e^2$. The head $d'$ is then turned and with it the type wheel $d^2$ so as to bring opposite the pointer $a^7$ the particular number by which the cow, whose milk is to be weighed, is designated. The type numerals on the rear face of this wheel are so arranged that under these conditions the same numeral is brought immediately adjacent to the fixed symbol $e^2$ on the block $e$, as shown in Fig. 3. The arm $g'$ is then moved into the position shown in dotted lines in Fig. 6, the various type wheels carried thereby having been previously moved to definite positions, as indicated by a pointer $g^9$ carried by the arm $g'$, so that the proper month, day of the month and year are in proper line with either the "A. M." or "P. M.," depending upon whether the morning or evening yield of milk is to be recorded. The operating trigger $k$ is then depressed, with the result that the platen $f$ is drawn back and then released, so that its upper raised portion $f^5$ strikes a sharp rebounding blow against the four type wheels $g^4$, $g^5$, $g^6$ and $g^7$, thereby causing an impression to be made by the ink ribbon upon the paper ribbon, which with it is interposed between said type wheels and said platen. The record thus made has the appearance indicated at $x^5$ in Fig. 7, and it is to be noted that the blow struck by the platen upon the type wheels causes the arm $g'$ to turn on its pivot and fall to its normal position shown in Figs. 1, 2 and 6.

It will be noted that the downward movement of the trigger $k$ causes a turning of the two wheels $m^4$ and $m^5$ and a corresponding partial revolution of that one of the ink ribbon reels $m^2$ or $m^3$ depending upon which one of the pawls $p$ has been placed in engagement with its ratchet wheel. As a consequence, the ink ribbon $y$ is fed forward for a definite distance. The movement of the wheel $m^5$ gives a corresponding movement to the pawl $l^8$, so that the nip roll $l^2$ is turned and the paper ribbon is fed forward a definite distance. The pail containing the milk to be weighed is now hung from the hook $b^6$, though if desired, the empty pail may have been previously hung on the hook and the zero adjustment of the type wheel $c^2$ made in order that the weights recorded may be net weights of the milk. As a result of this weight applied to the hook, the type wheel $c^2$ is turned through an angle proportional to and depending upon the weight of the milk, and the type numerals and scale on said wheel are so arranged that when the various parts are in equilibrium the numeral or scale divisions indicating this weight is directly opposite the indicating arrow $e^2$. A second depression of the trigger $k$ again draws back and releases the arm $f$, so that the platen $f^5$ makes another sharp forward movement, with the result that its lower projection $f^4$ presses the ink and paper ribbons upon the two type wheels $c^2$ and $d^2$ as well as upon the block $e$ and thereby causes an impression to be made such as that indicated at $x'$ in Fig. 7. This impression thus consists of the numeral by which the cow giving the milk weighed is designated, an indicating arrow, and a portion of the scale with one or more numerals thereof; the arrangement being such that the indicating arrow is opposite that portion of the scale corresponding to or indicating the exact weight of the milk. This second depression of the trigger $k$ again feeds forward the ink and paper ribbons, after which the bucket containing the milk may be removed and a second bucket holding milk from another cow may be suspended from the hook $b^6$. The wheel $d^2$ may then be turned so as to bring opposite the arrow $a^7$ another numeral which shall be that by which the cow giving this second quantity of milk is designated, after which another depression of the trigger causes a third record to be made such as that indicated at $x^2$. There is thus printed upon a relatively small and conveniently preserved length of ribbon, a record of the date, together with the weight of milk given by each cow of a herd, at the morning milking, and when it is desired to record the milk given in the evening, the type wheel $g^4$ is turned so as to bring the symbol "P. M." in line with the pointer, in place of that first used. The arm $g'$ is then moved to its vertical position and a record made on the paper ribbon similar to that shown at $x^5$, Fig. 7, except for the substitution of "P. M." for "A. M."; it being noted that the parts are so arranged that no record is made from the type wheels $c^2$ and $d^2$, when a record is taken from the date printing wheels.

It is of course obvious that while our invention is particularly designed for weighing milk, it may, with equal advantage be employed to weigh and record the weight of any desired material. If desired, the front face of the wheel $c^2$ may be provided with figures so that a visual indication may be had of the weight of an object suspended from the hook $b^6$.

By the use of the particular platen operating mechanism, described and illustrated, the force of the blow delivered by the platen for the purpose of printing a record is invariable, since owing to the action of the trigger it is altogether independent of the operating force applied to said trigger.

While for the sake of brevity we have referred to the parts $b$, $b'$, etc., connecting the hook with the shaft or spindle $c$, as a balance, it will be understood that any other form of device may be substituted for these parts whereby there is caused a revolution of the said shaft proportional to the weight of the body hung to said hook.

While we have shown the preferred form of mechanism for operating the platen, it will be understood that any other operating means may be employed whereby the platen is caused to strike a sharp blow so as to form a series of uniform impressions upon the record ribbon.

Although we have shown a series of independent dating wheels carried on the arm $q'$, we may, if desired, modify the construction of this part of our invention or in some cases altogether omit it.

We claim:—

1. The combination in a weighing machine of a balance, means for supporting a record receiving ribbon; a scale wheel actuated by the balance; a device structurally independent of the scale wheel and bodily adjustable in a plane at right angles to the plane of said wheel for indicating the date; and mechanism operatively independent of the date indicating device but coöperating therewith and with the scale wheel for printing records therefrom on the ribbon.

2. The combination of a balance; a scale and an indicator movable relatively to each other under the action of the balance; means for supporting a record receiving ribbon; inking means; a platen; a spring tending to prevent movement thereof; and a spring trigger mounted in position to first move the platen against the action of the spring and then release it to cause it to make records from the scale and the indicator upon the ribbon.

3. The combination of a supporting structure having a balance having a scale and an indicator; means for supporting a ribbon; means for making upon the ribbon a record of the relative positions of the scale and indicator; and a manually adjustable device mounted on the supporting structure capable of being bodily moved, independently of the record making means; into position to coöperate with said latter means to form upon the ribbon a record of any desired date.

4. The combination in a weighing machine of a frame; a balance thereon; means for supporting a record ribbon on the frame; means for recording on said ribbon the weight of the body applied to the balance; with a member and means for mounting the same on the frame so as to be operatively independent of said recording means and movable at will into and out of a position in which it is capable of coacting with a portion of said recording means to make a record of the date upon the ribbon.

5. The combination in a weighing machine, of a supporting structure, a platen means for causing movement of said platen, a type carrying member automatically movable to an amount proportional to the weight of a body under treatment, with a second type carrying member movable at will independently of the platen into a position adjacent to the ribbon, and with the first member being capable of coöperating with the platen to make a record upon the ribbon, said second member being also free to be moved under the action of said platen into an inoperative position.

6. The combination of a balance, a scale and an indicator automatically movable relatively to each other under the action of the balance, a dating member and means for supporting the same, means for supporting a record ribbon adjacent to the scale and indicator, with a platen having operating means and capable of forming on said ribbon a record from the indicator and scale, said dating member being movable at will independently of the platen into a position to also coöperate with the platen to make a record upon a ribbon.

7. The combination of a frame, a balance supported thereon, a scale carrying wheel operatively connected to said balance so as to be automatically actuated thereby, a number carrying wheel lying in the same plane with the scale wheel and having means whereby it may be turned at will, a platen, means for supporting a record ribbon between the platen and the wheels, and means for operating the platen to cause it to coöperate with the wheels to make a record on said ribbon.

8. The combination in a weighing machine of a frame having a face plate; a balance; a wheel actuated thereby and having type on that face thereof distant from the face plate; a fixed indicator mounted in the plane of said type; means for supporting a ribbon adjacent the wheel and the indicator; and a platen back of the face plate but operative toward the same for forming a record from the type wheel and indicator upon the record ribbon.

9. The combination in a weighing machine of a frame having an abutment provided with an indicator; a balance; a wheel actuated therefrom and mounted on the frame so that a portion of its edge extends over said abutment; there being type on the face of said wheel opposite that adjacent said abutment; means for supporting a record ribbon; and means for forming a record from the type and indicator at will upon said ribbon.

10. The combination in a weighing machine of a frame having an abutment provided with an indicator; a balance mounted on the frame; two wheels rotatably mounted on the frame in positions such that portions of their edges extend immediately adjacent said abutment on opposite sides of the indicator; means for connecting one of the wheels with the balance; there being type on those faces of the wheels distant from the abutment; means for supporting a record ribbon adjacent the wheels and indicator; and means for simultaneously forming a record upon said ribbon from the indicator and from those portions of the wheels immediately adjacent thereto.

11. The combination in a weighing machine of a frame; a balance mounted thereon; an abutment on the frame having an indicator; two wheels rotatably carried by the frame of which one is connected to the balance so as to be actuated therefrom; each of said wheels having portions extending immediately adjacent the abutment on opposite sides of the indicator; and having type on those faces distant from the abutment; with a platen including a lever mounted on the frame so as to be operative toward the type wheels adjacent the indicator; means for supporting a body of record receiving material betwen the platen and the indicator and type wheels; and means for actuating said platen.

12. The combination in a weighing machine of a supporting structure; a balance; an indicator; a type carrying member mounted to be actuated from the balance; means for supporting a body of record receiving material adjacent the indicator and type carrying members; and means for making a record from said indicator and type carrying member; the same including a lever provided with a platen; operating means for said lever including a second lever structurally independent of said first lever but placed to be capable of oscillating said first lever through a predetermined arc.

13. The combination in a weighing machine of a supporting frame; a balance mounted thereon; a type carrying member connected to be actuated by said balance; an indicator; means for supporting a body of record receiving material adjacent the type carrying member and the indicator; and two levers mounted on the supporting structure; one of said levers being placed to coöperate with the type carrying member and indicator to form a record on the record receiving material; a spring normally holding the striking arm of said lever away from the type carrying member; with a second lever having an operating handle and an arm capable of detachably engaging one of the arms of said first lever so as to move it through a fixed arc.

In testimony whereof, we have signed our names to this specification, in the presence of two subscribing witnesses.

GEORGE R. MELONEY.
ALFRED F. WOOD.

Witnesses:
JAS. I. CATHCART, Sr.,
ISAAC LYSTER.